ced Feb. 2, 1971

3,560,497
2-PHENYL-as-TRIAZINE-3,5(2H,4H) DIONES
Max W. Miller, Stonington, Conn., assignor to Chas.
Pfizer & Co., Inc., New York, N.Y., a corporation of
Delaware
No Drawing. Filed Oct. 16, 1968, Ser. No. 768,191
Int. Cl. C07d 55/10
U.S. Cl. 260—248                6 Claims

ABSTRACT OF THE DISCLOSURE 2-phenyl-as-triazine-3,5(2H,4H) diones and novel 2-substituted-phenyl-as-triazine-3,5(2H,4H) diones and their use as agents for the control of coccidiosis are described.

BACKGROUND OF THE INVENTION

Coccidiosis, a protozoan infection in young poultry, is known to have far-reaching economic effects. It is characterized by intestinal disorders, anemia, hemorrhage, and general unthriftiness. Two types of coccidiosis are known—the first, cecal, is caused by the cocciduim *Eimeria tenella* and is characterized by severe hemorrhage on or about the fifth day after infection. The second type, intestinal, is caused by various species of Eimeria; namely, the *E. acervulina, E. necatrix, E. maxima, E. hagani, E. mitis, E. praecox,* and *E. brunetti.*

Extensive investigations into methods for controlling coccidiosis have led to the development of a wide variety of structural types of compounds such as sulfur, sulfa drugs, arsenicals, dihydro-1,3,5-triazines (U.S. Pat. 2,823,-161); 3-amino-as-triazine complexes with substituted ureas (U.S. Pat. 2,731,385); 1-phenyl-3-(3-as-triazinyl) ureas (U.S. Pat. 2,762,743); 5-fluorouracil (U.S. Pat. 3,017,-322); and as-triazine-3,5(2H,4H) dione (U.S. Pat. 2,956,-924) as coccidiostats.

The available agents are not completely satisfactory for the control of coccidiosis for one or more reasons. Many of these agents are relatively toxic and/or exhibit a low order of activity or possess a rather limited anticoccidial spectrum. Their effectiveness in suppressing or preventing the disease is frequently not high, and the high dosage levels required place an undue economic burden on the poultry grower.

SUMMARY OF THE INVENTION

It has now been found that a series of 2-phenyl-as-triazine-3,5(2H,4H) diones having the general formula

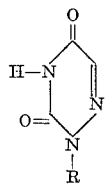

and the alkali metal and alkaline earth metal salts thereof wherein R is selected from the group consisting of pentafluorophenyl, pentachlorophenyl, 3,4-methylenedioxyphenyl, and

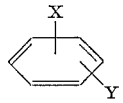

wherein
X is selected from the group consisting of hydrogen, halogen, lower alkoxy, nitro, trifluoromethyl, and cyano; and Y is selected from the group consisting of hydrogen, halogen, methyl, nitro, and trifluoromethyl;

are highly effective in controlling coccidiosis when orally administered in small doses to poultry. The terms "control" and "controlling"—as used herein—are intended to include the treatment; that is, the alleviation of symptoms, of established coccidial infections of poultry as well as the prevention (prophylaxis) of infection. However, because of the rapid clinical course of coccidial infections, the principal interest in these compounds resides in their use for the prevention of such infections.

The terms "lower alkyl" and "lower alkoxy"—as used herein—are intended to include alkyl and alkoxy groups having from one to four carbon atoms.

Of the variety of isomeric, homologous, and analogous phenyl-as-triazine-3,5(2H,4H) diones described in the art, it is only the 2-phenyl-as-triazine-3,5(2H,4H) diones, having the above formula, that are effective as agents for the control of coccidiosis. The isomeric 4- and 6-phenyl-as-triazine-3,5(2H,4H) diones are markedly less effective as coccidiostats than are the 2-phenyl derivatives of the above formula. Additionally, substitution at the 4- and/or 6-positions of the compounds, having the above formula, also markedly reduces coccidiostatic activity. Maximum anticoccidial activity in the 2-phenyl-as-triazine-3,5-(2H,4H) diones resides in compounds having the above formula. Although certain structural modifications in the phenyl moiety are compatible with anticoccidial activity, substitution at the 4- and/or 6-positions of the as-triazine nucleus adversely affects anticoccidial activity.

The compounds described herein may be administered to the poultry alone but are preferably administered in conjunction with a suitable inert carrier such as a nutritionally balanced poultry feed. Although the preferred route of administration is the oral route, it is also possible to administer these coccidiostatic compounds via the rectum. The compounds can, of course, as those skilled in the art will recognize, also be administered via the drinking water.

DETAILED DESCRIPTION OF THE INVENTION

The 2-phenyl-as-triazine-3,5(2H,4H) diones described herein are prepared by known methods such as described by Slouka, Monatsh. Chem. 96, 134–137 (1965), which comprises decarboxylation of the corresponding 6-carboxy derivatives. The requisite 6-carboxy acid derivatives are obtained by acid hydrolysis of the corresponding cyano compounds which are, in turn, prepared according to the procedure of Slouka, Monatsh. Chem. 94, 258–262 (1963). This method comprises reaction of the appropriate phenyl diazonium salt with cyano-acetylurethan to provide the corresponding phenylhydrazonocyanoacetylurethan which, under the influence of alkali, produces the 6-carboxy acid compound.

The 2-phenyl-as-triazine-3,5(2H,4H) diones described herein, which contain activating groups such as the 2-(2,4-dinitrophenyl) compounds, are also prepared by direct phenylation of the parent compound, as-triazine-3,5(2H,4H) dione, known trivially as 6-azauracil. The general procedure comprises treatment of as-triazine-3,5(2H,4H) dione in a suitable solvent system in the presence of an acid acceptor with the appropriate halobenzene such as 2,4-dinitrofluorobenzene. Suitable solvents are water, ethylene glycol, N,N-dimethylformamide, dimethylsulfoxide, and lower alkanols.

The molar proportion of reactants is not critical but can range from equimolar proportions up to a large excess of either reactant. In general, molar proportions of as-triazine-3,5(2H,4H) dione to halobenzene compound of from about 1:1 to about 1:2.0 are satisfactory.

The reaction temperature is not critical. In general, temperatures ranging from ambient temperature up to about 60° C. are favored. Higher temperatures or lower temperatures can, of course, be used but appear to offer no advantages. The reaction is generally conducted over a period of from about 2 to about 8 hours. Upon completion of the reaction, the reaction mixture is decolorized, if necessary; acidified to a pH of from about 3 to about 5; and cooled to precipitate the product. The product thus obtained is purified by methods known to those skilled in the art as, for example, by recrystallization from appropriate solvents, by chromatography on a suitable adsorbent, or by a combination of these methods.

The present agents may be orally administered to poultry in a suitable carrier therefor. It is generally convenient and, therefore, preferred to add the agents to the poultry feed so that a therapeutic dosage of the agent is ingested with the daily poultry ration. The agent may be added directly to the feed, as such, or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small proportions of the present potent agents are required. It is important that the compound be thoroughly blended into the premix and, subsequently, the feed. In this respect, the agent may be dispersed or dissolved in a suitable oily vehicle such as soybean oil, corn oil, cottonseed oil, and the like, or in a volatile organic solvent and then blended with the carrier. It will be appreciated that the proportions of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally balanced, finished feed containing a therapeutically effective level of one or more of the compounds of this invention. The mixtures are thoroughly blended by standard procedures, such as in a twin shell blender, to ensure homogeneity. The finished poultry feed should contain roughly between 50% and 80% of grains, between 0% and 10% animal protein, between 5% and 30% vegetable protein, between 2% and 4% minerals, together with supplemental vitaminaceous sources.

It will, of course, be obvious to those skilled in the art that the use levels of the compounds described herein will vary under different circumstances. Continuous low-level medication, during the growing period; that is, during the first 8 to 12 weeks for chickens, is an effective prophylactic measure. In the treatment of established infections, higher levels may be necessary to overcome the infection.

The present compounds may be employed at substantially low levels in feeds for the prevention or treatment of coccidiosis. Generally, the feed compositions of the present invention comprise a minor amount of the 2-phenyl-as-triazine compounds of this invention and a major amount of a nutritionally balanced feed, as described above. Feed compositions containing as little as 0.0015% of the present agent are found to effectively combat coccidiosis. Large amounts of the agent, up to 0.1% and larger, may also be employed. Of course, concentrations of less than 0.0015% provide some control of the infections. The concentration range favored in feed compositions is from about 0.0015% to about 0.05%. The preferred range is from about 0.0015% to about 0.025% of the ration. When administered by incorporation into the drinking water, preferably as an alkali metal or alkaline earth salt, the herein-described compounds are used at levels one-half the dosage given above for feeds.

The present feed compositions and supplements may also contain other effective therapeutic agents such as antibiotics to promote growth and general health of the poultry as well as sulfa compounds which may increase the effectiveness of the present coccidiostats.

Additionally, compounds of the above formula wherein at least one of the X and Y variables is selected from the group consisting of isonitrile, vinyl, lower alkanoyl, lower alkylsulfonyl, and —$CONR_2R_3$ wherein each of $R_2$ and $R_3$ is selected from the group consisting of hydrogen and lower alkyl, and $R_2$ together with $R_3$ and the nitrogen to which they are attached form a 5- or 6-membered ring such as pyrrolo, pyrrolidino, and piperidino, are also effective as agents for the prevention of coccidial infections. Further, analogous compounds wherein the phenyl moiety is trisubstituted, particularly at the 3, 4, and 5-positions, with substituents selected from the group consisting of halogen, nitro, cyano, methyl, lower alkoxy, trifluoromethyl, lower alkylsulfonyl, vinyl, isonitrile, lower alkanoyl, and —$CONR_2R_3$ are also valuable agents for the prevention of coccidial infections.

The following examples are given by way of illustration and are not to be considered as limitations of the present invention, many variations of which are possible without departing from the spirit or the scope thereof.

EXAMPLE I 2-(3,4-dichlorophenyl)-as-triazine-3,5(2H,4H) dione (A) 3,4-dichlorophenyl diazonium chloride: A 600 ml. beaker is charged with 3,4-dichloroaniline (40.6 g.) and water (30 ml.) and heated until the 3,4-dichloroaniline melts. Concentrated hydrochloric acid (50 ml.) is then added, the resulting solid slurried by addition of water (200 ml.), and cooled to 5° C. A solution of sodium nitrite (18 g. in 36 ml. of water) is added dropwise while keeping the stem of the dropping funnel below the surface of the liquid. The addition of the sodium nitrite solution is continued until a positive test with potassium iodide test paper is obtained.

(B) 3,4-dichlorophenylhydrazono-cyanoacetylurethan: The resulting greenish colored slurry of the diazonium chloride salt is then added dropwise to a stirred solution of cyanoacetylurethan (22.9 g.) in water (3240 ml.) containing pyridine (108 ml.) and cracked ice (1080 g.). The temperature is held at about 0° C. during the addition and the reaction mixture stirred for 15 minutes following completion of addition. The orange precipitate which forms is removed by filtration, washed with water, and dried.

A second batch of 3,4-dichlorophenylhydrazono-cyanoacetylurethan, similarly prepared, is combined with the first batch and the combined product recrystallized from acetonitrile and dried. Yield=60%; M.P.=199°–201° C.

Analysis.—Calcd. for $C_{12}H_{10}O_3N_4Cl_2$ (percent): C, 43.78; H, 3.06; N, 17.02. Found (percent): C, 43.67; H, 3.09; N, 16.92.

(C) 2-(3,4-dichlorophenyl)-as-triazine-3,5(2H,4H) dione 6-carboxylic acid: To a solution of potassium hydroxide (600 ml. of 1 N) in a 2-liter round-bottom flask fitted with a stirrer and condenser is added 3,4-dichlorophenylhydrazono-cyanoacetylurethan (49 g.). The suspension is refluxed for 2.5 hours, then cooled and filtered.

The filtrate is acidified to pH 2, the resulting solid filtered off, slurried in saturated sodium bicarbonate solution (600 ml.), and filtered. The filtrate is acidified to pH 2, the resulting solid (a monohydrate) filtered off, dried, and recrystallized from methylisobutyl ketone, then from acetic acid-water; M.P.=214°–215° C. Additional product is recovered from the acidified filtrate by evaporation.

*Analysis.*—Calcd. for $C_{10}H_5O_4N_3Cl_2 \cdot H_2O$ (percent): C, 37.52; H, 2.21; N, 13.13. Found (percent): C, 37.87; H, 2.09; N, 13.14.

The 2-(3,4-dichlorophenyl) - as - triazine - 3,5(2H,4H) dione 6-carboxylic acid is decarboxylated by heating to 270° C. for 30 minutes in a round-bottom flask fitted with a condenser and immersed in a Wood's metal bath.

The melt was then cooled and recrystallized from ethanol: M.P.=225°–226° C.

*Analysis.*—Calcd. for $C_9H_5O_2N_3Cl_2$ (percent): C, 41.89; H, 1.95; N, 16.28. Found (percent): C, 41.90; H, 2.00; N, 16.14.

EXAMPLE II

The 2-phenyl-as-triazine-3,5(2H,4H) diones listed below are prepared from the appropriate aniline compounds by the procedure of Example I.

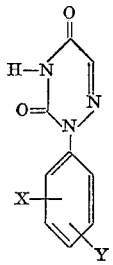

| X | Y | X | Y | X | Y |
|---|---|---|---|---|---|
| H | H | H | 3-CF$_3$ | 3-F | 5-F |
| H | 2-Cl | 2-CN | H | 2-Cl | 5-F |
| H | 3-Cl | 3-CN | H | 3-Cl | 4-F |
| H | 4-Cl | 4-CN | H | 4-Cl | 3-F |
| H | 2-Br | 2-OCH$_3$ | H | 5-Br | 2-Cl |
| H | 3-Br | 3-OC$_3$H$_7$ | H | 3-Cl | 4-Br |
| H | 4-Br | 4-OCH$_3$ | H | 4-Br | 3-I |
| H | 3-I | 2-Cl | 3-Cl | 3-Br | 4-I |
| H | 4-I | 2-Cl | 4-Cl | 2-Cl | 6-CH$_3$ |
| H | 2-F | 2-Cl | 6-Cl | 3-Cl | 4-CH$_3$ |
| H | 4-F | 4-Cl | 6-Cl | 5-Cl | 2-CH$_3$ |
| H | 2-CH$_3$ | 3-Br | 4-Br | 4-NO$_2$ | 3-CH$_3$ |
| H | 3-CH$_3$ | 2-Br | 3-Br | 3-NO$_2$ | 4-CH$_3$ |
| H | 4-CH$_3$ | 3-Br | 5-Br | 2-NO$_2$ | 6-CH$_3$ |
| H | 2-NO$_2$ | 3-I | 4-I | 5-NO$_2$ | 2-CH$_3$ |
| H | 3-NO$_2$ | 2-I | 6-I | 6-OCH$_3$ | 2-Cl |
| H | 4-NO$_2$ | 2-I | 5-I | 4-OCH$_3$ | 3-Cl |
| H | 2-CF$_3$ | 2-F | 4-F | 2-OCH$_3$ | 5-Br |
| 2-CN | 4-NO$_2$ | 3-Br | 4-I | 4-OCH$_3$ | 3-F |
| 2-OCH$_3$ | 5-NO$_2$ | 2-Cl | 4-NO$_2$ | 2-CN | 5-Cl |
| 3-OCH$_3$ | 4-NO$_2$ | 4-F | 2-NO$_2$ | 2-CN | 6-Cl |
| 3-OCH$_3$ | 4-CH$_3$ | 3-CF$_3$ | 2-NO$_2$ | 2-Cl | 4-CF$_3$ |
| 4-OCH$_3$ | 3-CH$_3$ | 5-CF$_3$ | 3-NO$_2$ | 4-Cl | 3-CF$_3$ |
| 2-OCH$_3$ | 5-CH$_3$ | 3-CF$_3$ | 4-NO$_2$ | 2-Cl | 5-CF$_3$ |
| 4-OC$_2$H$_5$ | 2-CH$_3$ | 2-NO$_2$ | 3-NO$_2$ | 2-Br | 3-CF$_3$ |
| 2-OCH$_3$ | 3-CF$_3$ | 3-NO$_2$ | 5-NO$_2$ | 2-F | 5-CF$_3$ |
| 2-OCH$_3$ | 5-CF$_3$ | 2-NO$_2$ | 6-NO$_2$ | 2-CF$_3$ | 5-CF$_3$ |
| 4-OCH$_3$ | 3-I | 2-NO$_2$ | 4-NO$_2$ | 3-F | 4-CH$_3$ |
| 2-OCH$_3$ | 5-I | 4-CN | 2-NO$_2$ | 2-Br | 6-CH$_3$ |
| 3-OCH$_3$ | 5-I | 4-CN | 2-CF$_3$ | 4-Br | 3-CH$_3$ |
| 4-OC$_2$H$_5$ | 3-I | 5-CN | 2-CF$_3$ | 4-F | 2-CH$_3$ |
| 3-OCH$_3$ | 4-Cl | 4-CN | 3-CH$_3$ | 2-I | 3-CH$_3$ |
| 4-OC$_2$H$_5$ | 3-Cl | 2-CN | 4-CH$_3$ | 3-I | 2-CH$_3$ |
| 2-OC$_2$H$_5$ | 5-Cl | 3-CN | 2-CH$_3$ | 3-I | 5-CH$_3$ |
| 4-Cl | 2-NO$_2$ | 3-CN | 5-CH$_3$ | 4-CN | 2-NO$_2$ |
| 4-Cl | 3-NO$_2$ | 2-CN | 4-CF$_3$ | 3,4- | 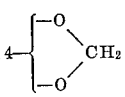 |

In like manner, the 2-pentachlorophenyl- and the 2-pentachlorophenyl-as-triazine-3,5(2H,4H) diones are prepared from the appropriate aniline compounds.

EXAMPLE III 2-(2,4-dinitrophenyl)-as-triazine-3,5(2H,4H) dione

To a solution of 6-azauracil (56.5 gms., 0.5 mole) and potassium hydroxide (101 gms. of 85% KOH) in water (750 ml.) is added dropwise, over a four-hour period, 2,4-dinitrofluorobenzene (109.8 g., 0.59 mole) at a temperature of 55°–60° C. The mixture is maintained at this temperature for an additional four hours, then cooled and extracted with 3× 250 ml. volumes of methylene chloride. It is then acidified to pH 3.5 with hydrochloric acid and the resulting precipitate collected, washed with water, and air dried, M.P.=160°–161° C.

EXAMPLE IV

The alkali metal and alkaline earth metal salts of the 2-phenyl-as-triazine-3,5(2H,4H) diones of Examples I–III are prepared by dissolving the appropriate compound in an aqueous or aqueous alcohol solution containing an equivalent amount of the alkali metal (sodium, lithium, potassium) or alkaline earth metal (calcium, barium, strontium, magnesium) hydroxide. The salts are recovered by freeze drying the resulting solution.

EXAMPLE V

The coccidiostatic activity of 2-(3,4-dichlorophenyl)-as-triazine-3,5(2H,4H) dione is demonstrated as follows:

Groups of five nine-day old Barred Rock Cross strain cockerels are fed a basal ration into which the test compound is incorporated at various concentrations. The basal ration, a commercial chick starter (Purina Commercial Chick Starter, available from the Ralston Purina Co., St. Louis, Mo.), having the following composition, is presented ad libitum to the chicks 24 hours before infection and continuously thereafter throughout the course of the tests.

Basal ration composition

| | Percent |
|---|---|
| Crude protein not less than | 18.0 |
| Crude fat not less than | 3.0 |
| Crude fiber not more than | 6.0 |
| Added minerals not more than | 3.5 | supplied by the following ingredients:

Meat and bone meal, fish meal, soybean meal, ground barley, ground oats, ground yellow corn, dehydrated alfalfa meal, wheat middlings, vitamin $B_{12}$ supplement, ethoxyquin (a preservative), animal fat preserved with BHA,[1] choline chloride, niacin, vitamin A supplement, riboflavin supplement, calicum pantothenate, D activated animal sterol, vitamin E supplement, menadione sodium bisulfite (source of vitamin K activity),[2] calcium carbonate, low fluorine rock phosphate, iodized salt, manganese sulfate, manganous oxide, copper sulfate, zinc oxide.

Twenty-four hours after initiation of the medication, the chicks are inoculated orally with 200,000 sporulated oocysts (*Eimeria tenella*) and the average weight per bird per group determined. In addition, a group of ten chicks is fed the basal ration which contains more of the test compound (infected, untreated controls). A further group of ten chicks serves as uninfected, untreated controls. The chicks are examined on the fifth and sixth day postinfection for signs of hemorrhage. On the eighth day post-infection, the average body weight per bird per group is determined, the birds necropsied, the cecum examined macroscopically, and a pathology index (average degree of infection [A.D.I.]) determined. Chicks which die prior to the fifth day post-infection are considered toxic deaths. Those which die five days post-infection or later are considered as deaths due to disease. The efficacy of the test compound is judged by the prevention of mortality and by comparison of the pathologic index with that of the unmedicated infected controls. The degree of pathologic involvement at necropsy is expressed as the average degree based on the following schemes; 0=no cecal lesions; 1=slight lesions; 2=moderate lesions; 3=severe lesions; 4=death.

---

[1] BHA=butylated hydroxyanisole.
[2] Menadione sodium bisulfite=2 - methyl - 1,4 - naphthaquinone sodium bisulfite.

The concentration of test compound in the feed which will produce normal weight gains relative to the uninfected, untreated controls and normal pathology relative to the infected, untreated controls, referred to as the minimum effective concentration (MEC), is thus found to be 0.006%.

In like manner, the coccidiostatic activity of the compounds of Examples II and III is determined.

EXAMPLE VI

Various levels of 2-(3,4-dichlorophenyl)-as-triazine-3,5(2H,4H) dione are thoroughly blended into a nutritionally balanced diet having the composition shown below to provide feeds containing 0.0015%, 0.001%, 0.0025%, 0.005%, 0.01%, 0.025%, 0.05%, and 0.1%, respectively, of the active agent.

|  | Percent |
|---|---|
| Ground yellow corn | 51.28 |
| Soybean oil meal (51%) | 38.15 |
| Corn oil | 6.10 |
| $CaCO_3$ | 1.20 |
| Dicalcium phosphate | 1.35 |
| Salt | 0.61 |
| Delamix (commercially available mineral mix containing $CaCO_3$ and small amounts of: iron, zinc, manganese, and so forth, salts. Limestone Products Corporation of America, N.J.) | 0.1 |
| Vitamin A (5305 I.U./lb.) | 0.1 |
| Vitamin $D_3$ (681 I.C.U./lb.) | 0.05 |
| Klotogen F (commercially available form of vitamin K, Abbott Laboratories) | 0.0003 |
| Pyridoxine hydrochloride | 0.0006 |
| D.I.-methionine | 0.140 |
| Niacin U.S.P. | 0.0025 |
| Choline Chloride (25%) | 0.2 |
| Riboflavin | 0.06 |
| Calcium pentothenate (45%) | 0.002 |
| Myvanix (commercially available form of vitamin E) | 0.005 |

Such feeds, when administered ad libitum to nine-day old chicks and to medium-sized turkey poults infected with E. tenella—as described in Example V—are effective in controlling the coccidial infection.

The products of Examples II and III, when tested at levels of 0.0015%, 0.001%, 0.01%, and 0.05%, produce results comparable to those of the above compositions.

What is claimed is:

1. A compound of the formula

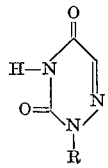

and the alkali metal and alkaline earth metal salts thereof wherein R is selected from the group consisting of pentafluorophenyl, pentachlorophenyl, 3,4 - methylenedioxyphenyl, and

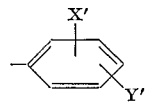

wherein

X' is selected from the group consisting of halogen, lower alkoxy, nitro, trifluoromethyl, and cyano; and Y' is selected from the group consisting of halogen, methyl, nitro, and trifluoromethyl.

2. The compound of claim 1 wherein R is pentafluorophenyl.

3. The compound of claim 1 wherein R is

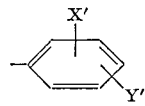

wherein each of X' and Y' is halogen.

4. The compound of claim 1 wherein R is

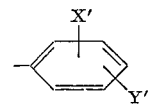

wherein X' is halogen and Y' is trifluoromethyl.

5. The compound of claim 3 wherein X' is 3-chloro and Y' is 4-chloro.

6. The compound of claim 4 wherein X' is 4-chloro and Y' is 3-trifluoromethyl.

References Cited

Novacek et al.: Coll. Czech. Chem. Comm., vol 30, pp. 3890–4 (1965).

Slouka: Monatsh. Chem., vol. 96, pp. 134–7 (1965).

JOHN M. FORD, Primary Examiner

U.S. Cl. X.R.

99—4; 424—249